United States Patent
Everhart et al.

(10) Patent No.: US 9,291,082 B2
(45) Date of Patent: Mar. 22, 2016

(54) SYSTEM AND METHOD OF A CATALYTIC REACTOR HAVING MULTIPLE SACRIFICIAL COATINGS

(71) Applicant: General Electric Company, Schenectady, NY (US)

(72) Inventors: Richard Todd Everhart, Simsponville, SC (US); Rebecca Evelyn Hefner, Fountain Inn, SC (US); Cristina Colindres Kraemer, Greer, SC (US); Gilbert Otto Kraemer, Greer, SC (US); Surinder Singh Pabla, Greer, SC (US); Stephen Gerard Pope, Greer, SC (US)

(73) Assignee: General Electric Company, Schenectady, NY (US)

( * ) Notice: Subject to any disclaimer, the term of this patent is extended or adjusted under 35 U.S.C. 154(b) by 760 days.

(21) Appl. No.: 13/627,973

(22) Filed: Sep. 26, 2012

(65) Prior Publication Data
US 2014/0086810 A1    Mar. 27, 2014

(51) Int. Cl.
*F01N 3/28* (2006.01)
*F23C 13/02* (2006.01)
(Continued)

(52) U.S. Cl.
CPC ............ *F01N 3/2803* (2013.01); *B01D 53/864* (2013.01); *B01D 53/8643* (2013.01);
(Continued)

(58) Field of Classification Search
CPC ............ F01N 3/28; F01N 3/2803–3/2896; F01N 2510/00; F01N 2510/06; F01N 2510/068; F01N 2510/0684; F23R 3/40; Y10T 29/49885; Y10T 29/49345; F23C 13/00–13/08; F23C 2900/13001; F23C 2900/13002; B01J 37/0219; B01J 37/023; B01J 37/0215; B01J 33/00; B01J 23/58; B01J 23/6447; B01J 23/78; B01J 23/8437; B01D 53/88; B01D 53/864; B01D 53/8643; B01D 2257/502; B01D 2257/702; F23D 2900/00001
USPC ............ 502/527.12, 159; 422/177, 222
See application file for complete search history.

(56) References Cited

U.S. PATENT DOCUMENTS

| | | | |
|---|---|---|---|
| 3,830,756 | A | 8/1974 | Sanchez et al. |
| 4,254,739 | A | 3/1981 | Enga |

(Continued)

FOREIGN PATENT DOCUMENTS

| | | |
|---|---|---|
| EP | 1519116 B1 | 3/2005 |
| EP | 1320705 B2 | 5/2008 |

(Continued)

OTHER PUBLICATIONS

Eriksson, S. et al., "Fuel-Rich Catalytic Combustion of Methane in Zero Emissions Power Generation Processes," Catalysys Today 117, (2006), p. 447-453.

(Continued)

*Primary Examiner* — Phutthiwat Wongwian
*Assistant Examiner* — Alain Chau
(74) *Attorney, Agent, or Firm* — Fletcher Yoder, PC

(57) ABSTRACT

A system includes a catalytic reactor configured to mount to a combustor. The catalytic reactor includes a catalyst configured to reduce emissions associated with combustion in the combustor. The catalytic reactor also includes a first and a second sacrificial coating disposed over the catalyst prior to mounting of the catalytic reactor into the combustor, wherein the first and second sacrificial coatings are removable while the catalytic reactor is mounted to the combustor without damaging the catalyst.

20 Claims, 9 Drawing Sheets

(51) Int. Cl.
*B01J 33/00* (2006.01)
*B01D 53/88* (2006.01)
*B01D 53/86* (2006.01)
*B01J 37/02* (2006.01)
*F23C 13/06* (2006.01)

(52) U.S. Cl.
CPC ............... *B01D53/88* (2013.01); *B01J 33/00* (2013.01); *B01J 37/0215* (2013.01); *F23C 13/02* (2013.01); *B01D 2257/502* (2013.01); *B01D 2257/702* (2013.01); *F01N 2510/00* (2013.01); *F01N 2510/0684* (2013.01); *F23C 13/06* (2013.01); *Y10T 29/49345* (2015.01); *Y10T 29/49885* (2015.01)

(56) References Cited

U.S. PATENT DOCUMENTS

| | | | |
|---|---|---|---|
| 4,276,203 | A | 6/1981 | Pfefferle |
| 4,415,537 | A | 11/1983 | Vine |
| 4,534,165 | A | 8/1985 | Davis, Jr. et al. |
| 4,643,667 | A | 2/1987 | Fleming |
| 4,794,753 | A | 1/1989 | Beebe |
| 4,857,499 | A | 8/1989 | Ito |
| 4,966,001 | A | 10/1990 | Beebe |
| 5,026,273 | A | 6/1991 | Cornelison |
| 5,047,381 | A * | 9/1991 | Beebe ............... 502/304 |
| 5,102,850 | A | 4/1992 | Sanchez |
| 5,143,949 | A | 9/1992 | Grogan |
| 5,235,804 | A | 8/1993 | Colket, III et al. |
| 5,248,251 | A * | 9/1993 | Dalla Betta et al. ............... 431/7 |
| 5,355,668 | A | 10/1994 | Weil et al. |
| 5,460,002 | A | 10/1995 | Correa |
| 5,721,188 | A | 2/1998 | Sung |
| 5,873,500 | A | 2/1999 | Homburg et al. |
| 5,891,584 | A | 4/1999 | Coffinberry |
| 6,155,819 | A | 12/2000 | Etemad et al. |
| 6,174,159 | B1 | 1/2001 | Smith et al. |
| 6,286,298 | B1 | 9/2001 | Burrus et al. |
| 6,294,498 | B1 * | 9/2001 | Darcissac et al. ............... 502/159 |
| 6,358,040 | B1 | 3/2002 | Pfefferle et al. |
| 6,358,879 | B1 | 3/2002 | Pfefferle et al. |
| 6,394,791 | B2 | 5/2002 | Smith et al. |
| 6,460,345 | B1 | 10/2002 | Beebe et al. |
| 6,588,213 | B2 | 7/2003 | Newberry |
| 6,748,745 | B2 | 6/2004 | Ul Karim et al. |
| 6,752,623 | B2 | 6/2004 | Smith et al. |
| 6,921,738 | B2 * | 7/2005 | Hwang et al. ............... 502/240 |
| 6,925,811 | B2 | 8/2005 | Justis et al. |
| 7,003,958 | B2 | 2/2006 | Dinu et al. |
| 7,003,959 | B2 | 2/2006 | Ackermann et al. |
| 7,007,478 | B2 | 3/2006 | Dinu |
| 7,093,438 | B2 | 8/2006 | Dinu et al. |
| 7,093,445 | B2 | 8/2006 | Corr, II et al. |
| 7,208,230 | B2 | 4/2007 | Ackermann et al. |
| 7,278,265 | B2 | 10/2007 | Alvin et al. |
| 7,332,143 | B2 | 2/2008 | Symrniotis |
| 7,446,070 | B2 * | 11/2008 | Hori et al. ............... 502/60 |
| 7,531,479 | B2 | 5/2009 | Burns |
| 7,617,682 | B2 | 11/2009 | Bruck |
| 2002/0086796 | A1 * | 7/2002 | Eckardt et al. ............... 502/339 |
| 2003/0056520 | A1 | 3/2003 | Campbell |
| 2003/0125202 | A1 * | 7/2003 | Ruwisch et al. ............... 502/328 |
| 2003/0153453 | A1 * | 8/2003 | Kasahara et al. ............... 502/64 |
| 2007/0037105 | A1 | 2/2007 | Pfefferle et al. |
| 2008/0003155 | A1 | 1/2008 | Jia et al. |
| 2008/0282843 | A1 * | 11/2008 | Holgersen ............... 75/403 |
| 2010/0180597 | A1 * | 7/2010 | Kraemer et al. ............... 60/723 |
| 2011/0123715 | A1 * | 5/2011 | Anfang et al. ............... 427/259 |
| 2011/0160050 | A1 * | 6/2011 | Feaviour ............... 502/304 |

FOREIGN PATENT DOCUMENTS

| | | |
|---|---|---|
| WO | 03072919 B3 | 9/2003 |
| WO | 2004099668 B4 | 11/2004 |
| WO | 2005026675 B5 | 3/2005 |

OTHER PUBLICATIONS

Smith, L.L. et al., "Rich-Catalytic Lean-Burn Combustion for Fuel-Flexible Operation with Ultra Low Emissions," Catalysis Today 117, (2006) 438-446.

Etemad, Shahrokh et al., "System Study of Rich Catalytic/Lean burn (RCL®) Catalytic Combustion for Natural Gas and Coal-Derived Syngas Combustion Turbines," DOE Contract No. DE-FG26-02NT41521, Prepared by: Precision Combustion, Inc., North Haven, Connecticut 06473(2004).

Staudt, J., "Status Report on NOx Controls for Gas Turbines Cement Kilns Industrial Boilers Internal Combustion Engines." Technologies & Cost Effectiveness. (Dec. 2000): 1-219.

Illinois Environmental Protection Agency, "Technical Support Document for Controlling NOx Emissions from Stationary Reciprocating Internal Combustion Engines and Turbines." AQPSTR 07-01. (2007): 1-85.

"Alternative Control Techniques Document—NOx Emissions from Stationary Gas Turnines." Emission Standards Division. (1993): 1-399.

Baird, Benjamin. "Ultra Low NOx Using Rich Catalytic/Lean-Burn Catalytic Pilots: Gas Turbine Engine Test." Proceedings of ASME Turbo Expo 2009: Power for Land, Sea and Air. (2008): 1-9.

Etemad, S., "Ultra Low NOx Catalytic Combustion for IGCC Power Plants." Phase II Final Technical Report . (2008): 1-22.

Schilke, P.W. "Advanced Gas Turbine Materials and Coatings." (Aug. 2004): 1-30.

Smith, Lance. "Topical Report." Ultra Low NOx Catalytic Combustion for IGCC Power Plants. (Mar. 2004): 1-24.

Laster, W.R. "Catalytic Combustor for Fuel-Flexible Turbine." Technical Progress Report, Oct. 2005 through Mar. 2006. (2006): 1-34.

Laster, W.R. "Catalytic Combustor for Fuel-Flexible Turbine." Technical Progress Report, Apr. 2005 through Sep. 2005. (2005): 1-20.

Laster, W.R. "Development of a Catalytic Combustor for Fuel Flexible Turbines." Siemens Westinghouse Power Corporation. (2005): 1-10.

Richani, Brahim. "Support for Elimination of Oxidation Catalyst Requirements for GE PG7241FA DLN Combustion Turbines." (Aug. 2001): 1-10.

Schorr, Marvin. "Gas Turbine NOx Emissions Approaching Zero—Is it Worth the Price?." GER 4172. (Sep. 1999): 1-12.

Kaufman, Eric. "Considerations When Burning Ash-Bearing Fuels in Heavy-Duty Gas Turbines." GER-3764A. (Aug. 1996): 1-40.

Rao, A.D. "Systems Analyses of Advanced Brayton Cycles for High Efficiency Zero Emission Plants." Final Report. (Dec. 2008): 1-570.

Badeer, G.H. "GE Aeroderivative Gas Turbines—Design and Operating Features." GER-3695E. (2000): 1-24.

Major, Bill. "Cost Analysis of NOx Control Alternatives for Stationary Gas Turbines." Onsite Sycom Energy Corporation. (Nov. 1999): 1-54.

Laster, W.R. "Catalytic Combustor for Fuel-Flexible Turbine." Final Report Phase 2, Oct. 2004 through Oct. 2007 (2007): 1-50.

* cited by examiner

SYSTEM AND METHOD OF A CATALYTIC REACTOR HAVING MULTIPLE SACRIFICIAL COATINGS

BACKGROUND OF THE INVENTION

The subject matter disclosed herein relates to catalytic reactors and more specifically, to sacrificial coatings that may be employed within catalytic reactors.

Catalytic reactors may be generally used within combustion processes, for example, within gas turbine engines or catalytic reformers, to reduce emissions created during combustion. During combustion, compounds such as nitric oxide and nitrogen dioxide (collectively known as NOx) may be formed at high temperatures, for example, temperatures exceeding approximately 1430° C. Catalytic reactors may employ catalysts that lower the reaction temperatures for combustion, thereby reducing formation of these compounds. During certain combustion operations, it may be desirable to protect the catalysts within the catalytic reactors.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a catalytic reactor configured to mount to a combustor. The catalytic reactor includes a catalyst configured to reduce emissions associated with combustion in the combustor. The catalytic reactor also includes a first sacrificial coating disposed over the catalyst prior to mounting of the catalytic reactor into the combustor, wherein the first sacrificial coating is removable while the catalytic reactor is mounted to the combustor without damaging the catalyst.

In a second embodiment, a method includes applying a first sacrificial coating over a catalyst of a catalytic reactor, and mounting the catalytic reactor to a combustor after applying the first sacrificial coating over the catalyst. The sacrificial coating is removable while the catalytic reactor is mounted to the combustor without damaging the catalyst.

In a third embodiment, a method includes protecting a catalyst of a catalytic reactor mounted to a combustor with at least one sacrificial coating during a first period of combustion in the combustor, and reducing emissions with the catalyst during a second period of combustion after the first period of combustion in the combustor. At least one sacrificial coating is removed from the catalyst after the first period and before the second period while the catalytic reactor remains mounted to the combustor.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
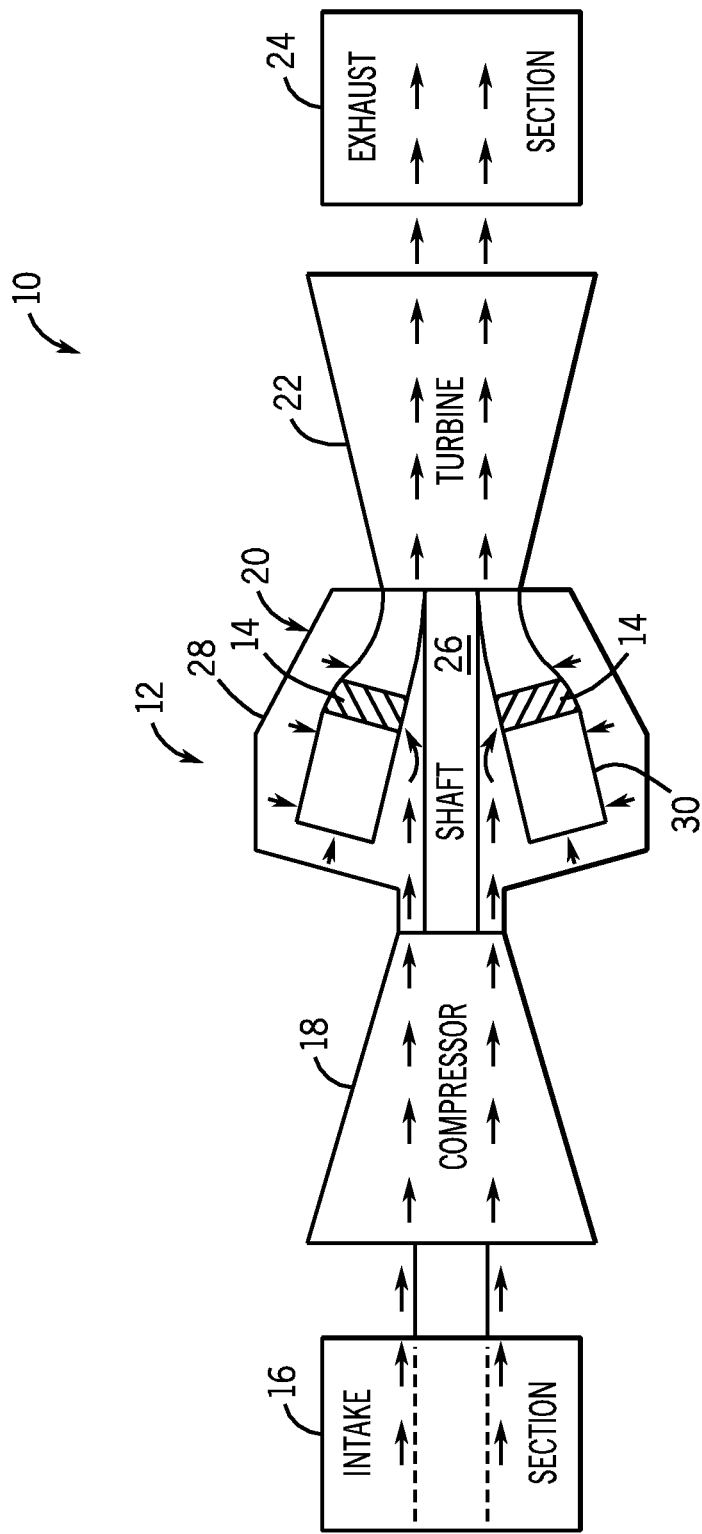
FIG. 1 is a schematic flow diagram of an embodiment of a gas turbine engine with a catalytic reactor that may employ sacrificial coatings.

One or more specific embodiments of the present invention will be described below. In an effort to provide a concise description of these embodiments, not all features of an actual implementation may be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to sacrificial coatings that may be employed in catalytic reactors to protect the catalyst. During certain periods of operation, for example, during start-up or commissioning of a combustor within a gas turbine engine or after installation of a new compressor, a higher level of contaminants and/or particulates may be convected downstream to the combustor. These contaminants and/or particulates may flow into the catalytic reactor and may foul or otherwise degrade the catalyst within the reactor. For example, certain particulates may adhere to the catalyst, covering the catalyst surface, effectively reducing the area available for catalytic interaction during combustion. Accordingly, before these periods of operation, it may be desirable to apply one or more sacrificial coatings to the catalyst to protect the catalyst during these periods of operation.

The sacrificial coatings may be applied during manufacturing, maintenance, or servicing of the catalytic reactor. Particularly, the sacrificial coating may be applied over the catalytic surface during manufacture of the catalytic reactor. For example, the sacrificial coatings may be applied to the catalytic reactor before installation of the catalytic reactor into the combustor and/or before installation of the combustor into the gas turbine engine. By further example, the sacrificial coatings may be applied to the catalytic reactor while the combustor and/or gas turbine engine is in an offline or non-operational state, i.e., not actively combusting a fuel/air mixture to generate power, which may occur during a servicing or repair operation.

As a result, the sacrificial coatings are in place over the catalytic reactor immediately at the time of starting up the combustor and/or gas turbine engine. After the period of operation when desired catalyst protection ends, such as after the first approximately 10 to 1000, 25 to 500, or 50 to 200 operating hours for a new gas turbine engine, the sacrificial coatings may be removed by one or more removal techniques (e.g., water wash, thermal removal, chemical removal, pressure wave removal, etc.). However, the interval for maintaining the sacrificial coatings may vary and would be application dependent. Specifically, the sacrificial coatings may include a frangible, or easily broken apart, coating that can be chemically removed or mechanically removed while the catalytic reactor is installed within the combustor. For example, the sacrificial coatings may include a water-soluble coating that may be removed during a compressor, combustor, and/or turbine wash. The sacrificial coatings also may be removed with heat, e.g., by gradually thermally degrading the sacrificial coating until it is completely removed over a limited time period. Furthermore, the sacrificial coatings may be removed with mechanical vibration and/or pressure waves, e.g., by applying acoustic waves from an acoustic horn or speaker or by applying pressure waves from a combustion-driven device. In some embodiments, the sacrificial coatings may be removed by inducing combustion dynamics in the combustor, thereby generating pressure waves and vibration to help break the sacrificial coatings off of the catalytic reactor. In certain embodiments, the sacrificial coating may be catalytically active to provide catalytic properties while the catalyst is protected. For example, while the sacrificial coating is disposed over the catalyst, the surface area of the catalyst may be concealed, thereby reducing the catalytic benefits. The catalytic properties of the sacrificial coatings may be used to temporarily replace or supplement the catalyst to lower the reaction temperature and reduce emissions while the sacrificial coating is present in the catalytic reactor.

In general, the sacrificial coatings may be applied to catalytic reactors within a range of combustion settings, such as gas turbines, engines, and reformers. FIG. 1 illustrates an exemplary application for sacrificial coatings and depicts a system 10 comprising a gas turbine engine 12 that may employ catalytic reactors 14 with sacrificial coatings. The sacrificial coatings may include sacrificial coatings that are applied before assembly and operation of the gas turbine engine 12, as well as sacrificial coatings that may be applied after assembly of the gas turbine engine 12. In certain embodiments, the system 10 may include an aircraft, a watercraft, a locomotive, a power generation system, or combinations thereof. The illustrated gas turbine engine 12 includes an air intake section 16, a compressor 18, a combustor section 20, a turbine 22, and an exhaust section 24. The turbine 22 is coupled to the compressor 18 via a shaft 26.

As indicated by the arrows, air may enter the gas turbine engine 12 through the intake section 16 and flow into the compressor 18, which compresses the air prior to entry into the combustor section 20. The illustrated combustor section 20 includes a combustor housing 28 disposed concentrically or annularly about the shaft 26 between the compressor 18 and the turbine 22. The compressed air from the compressor 18 enters combustors 30 where the compressed air may mix and combust with fuel within the catalytic reactors 14. Some or all of the combustion may occur within the catalytic reactors 14, which, as discussed above, may lower the temperatures downstream to reduce emissions.

From the combustor section 20, the hot combustion gases flow through the turbine 22, driving the compressor 18 via the shaft 26. For example, the combustion gases may apply motive forces to turbine rotor blades within the turbine 22 to rotate the shaft 26. After flowing through the turbine 22, the hot combustion gases may exit the gas turbine engine 12 through the exhaust section 24.

Figure 2:
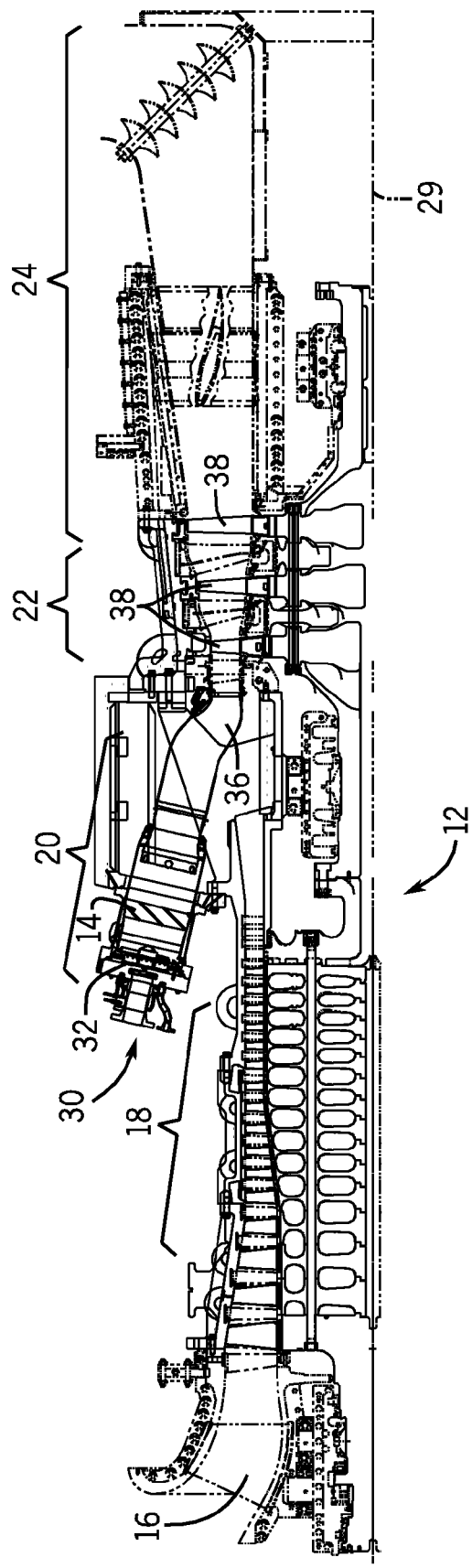
FIG. 2 is a sectional view of an embodiment of the gas turbine engine of FIG. 1 sectioned through the longitudinal axis.

FIG. 2 is a cross-sectional side view of an embodiment of the gas turbine engine 12 of FIG. 1 taken along a longitudinal axis 29. The gas turbine engine 12 includes one or more fuel nozzles 32 located inside the combustor section 20. In certain embodiments, the gas turbine engine 12 may include multiple combustors 30 disposed in an annular arrangement. Further, each combustor 30 may include multiple fuel nozzles 32 attached to the base of each combustor 30 in an annular or other arrangement.

As described above with respect to FIG. 1, air may enter the engine 12 through the air intake section 16 and be compressed by the compressor 18. The compressed air from the compressor 18 may then be directed into the combustor section 20 where the compressed air may be mixed with fuel. For example, the fuel nozzles 32 may inject a fuel-air mixture into the combustors 30 in a suitable ratio for optimal combustion, emissions, fuel consumption, and power output. Within the combustors 30, the fuel-air mixture may combust within the catalytic reactors 14 to generate hot, pressurized exhaust gases. The catalytic reactors 14 may generally include one or more catalysts that lower the reaction temperatures, thereby reducing the creation of undesirable byproducts, such as NOx and carbon monoxide, and/or improving flame stability. Combustion may also occur within the combustors 30 outside of the catalytic reactors 14. The hot pressurized exhaust gases produced by the combustion reaction may exit the combustor section 20 and flow through a transition section 36 to the turbine 22. Within the turbine 22, the pressurized exhaust gases may turn blades 38 that extend radially within the turbine 22 to rotate the shaft 26 (FIG. 1) before exiting through the exhaust section 24.

Figure 3:
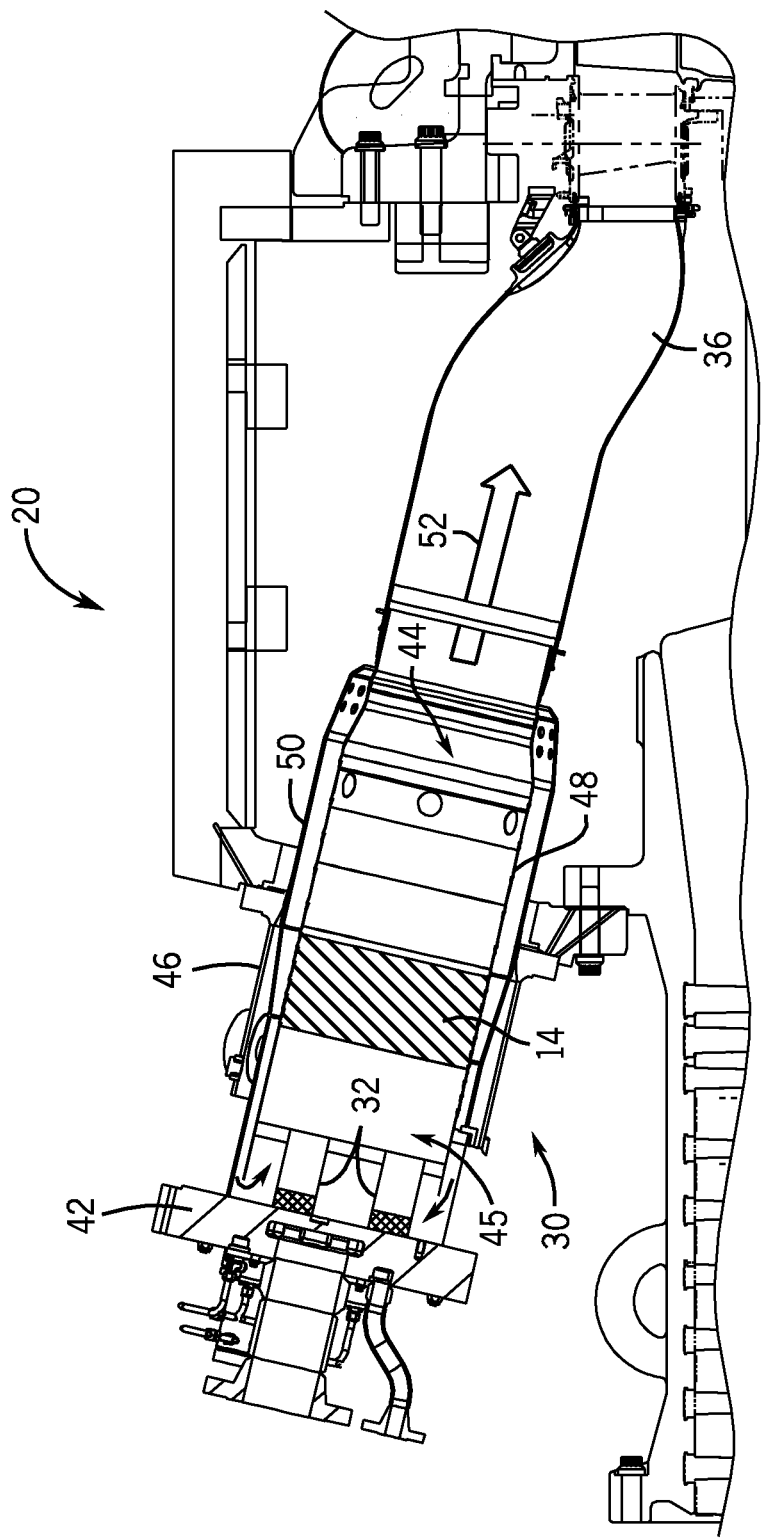
FIG. 3 is a detail view of a portion of the gas turbine engine of FIG. 2 depicting a combustor having the catalytic reactor.

A detailed view of an embodiment of the combustor section 20 is illustrated in FIG. 3. The premixing fuel nozzles 32 are attached to an end cover 42, near a head end of the combustor 30. Compressed fuel is directed through the end cover 42 to each of the fuel nozzles 32, which distribute a premixed air and fuel mixture into the combustor 30. The combustor 30 includes a combustion chamber 44 generally defined by a casing 46, a liner 48, and a flow sleeve 50. In certain embodiments, the flow sleeve 50 may be located coaxially about the liner 48 to direct air from the compressor into the combustion chamber 44 through perforations or other openings in the liner premixing section 45, as generally shown by the arrows.

Fuel nozzles 32 may distribute a pressurized fuel before the catalytic reactor 14 to permit premixing of fuel and air before the catalytic reactor 14. Within combustion chamber 44, the fuel-air mixture may flow through the catalytic reactor 14. The catalytic reactor 14 may generally include a catalyst that accelerates the combustion reactions to produce lower emissions. The catalyst may generally promote stable low temperature reactions of fuel and air to produce combustion exhaust gases 52. From the catalytic reactor 14, the combustion exhaust gases 52 may flow through the main section of the combustion chamber 44 and the transition section 36 where further combustion may occur. For example, partially combusted or reacted exhaust gases 52 may undergo thermal combustion within the combustion chamber 44 and/or the transition section 36.

The catalytic reactor 14 may be disposed along the liner 48 and/or across the chamber 44, and thus may be mounted or applied to the combustor section 20 in a variety of ways. For example, the catalytic reactor 14 may generally include a ceramic or metal substrate coated with a catalyst to form a catalyst bed. The catalyst bed may include any suitable structure, such as honeycombed cells, a packed bed, reticulated foam, a long tube, multiple tubes, a grid or screen, a monolith, a cylindrical shape, a plate, or the like. The substrate may be composed or fabricated of high temperature materials such as metal alloys, ceramics, metal oxides, intermetallic materials, carbides, nitrides, and the like. The structure of the catalyst bed may generally be coated with a reaction catalyst to accelerate the combustion reactions. For example, the catalyst bed may include a cylinder with a cross-section that includes honeycombed cells coated with a reaction catalyst. The type of catalyst may be specific to the combustion application and may vary based on the type of fuel used. For example, for a hydrocarbon based fuel, the catalyst may include elements such as zirconium, vanadium, chromium, manganese, copper, platinum, osmium, iridium, rhodium, cerium, lanthanum, other elements of the lanthanide series, copper, nickel, iron, magnesium, platinum, and platinum group metals (PGMs). The catalyst also may include other active ingredients of precious metals, group VIII noble metals, base metals, metal oxides, or any combinations thereof.

In other embodiments, the location of the catalytic reactor 14 within the combustor section 20 may vary. For example, the reactor may be generally disposed upstream or downstream of the main combustion chamber 44. Further, the catalytic reactor may be employed in rich or lean combustion environments. Moreover, additional components such as pre-burners, pre-mixers, multiple stages, one or more catalytic pilots or pilot burners, and the like may be included within the combustor section 20. In certain embodiments, the catalytic reactor 14 may be disposed within one of these additional components. For example, the catalytic reactor may be disposed within a rich catalytic reactor, lean catalytic reactor, pre-mixed combustor, catalytic pilot, or pre burner. Further, certain combustors 30 may include multiple catalytic reactors 14 made of the same or different catalyst materials, each having the same or different sacrificial coatings. For example, a first catalytic reactor 14 may be made of a first catalytic material with a first set of sacrificial coatings, a second catalytic reactor 14 may be made of a second catalytic material with a second set of sacrificial coatings, a third catalytic reactor 14 may be made of a third catalytic material with a third set of sacrificial coatings, and so forth. Each set of sacrificial coatings may include 1, 2, 3, 4, 5, or more sacrificial coatings that are made of the same or different sacrificial materials, and that may be removable by the same or different removal techniques (e.g., water wash, chemical removal, heat removal, pressure wave removal, etc.).

Figure 4:
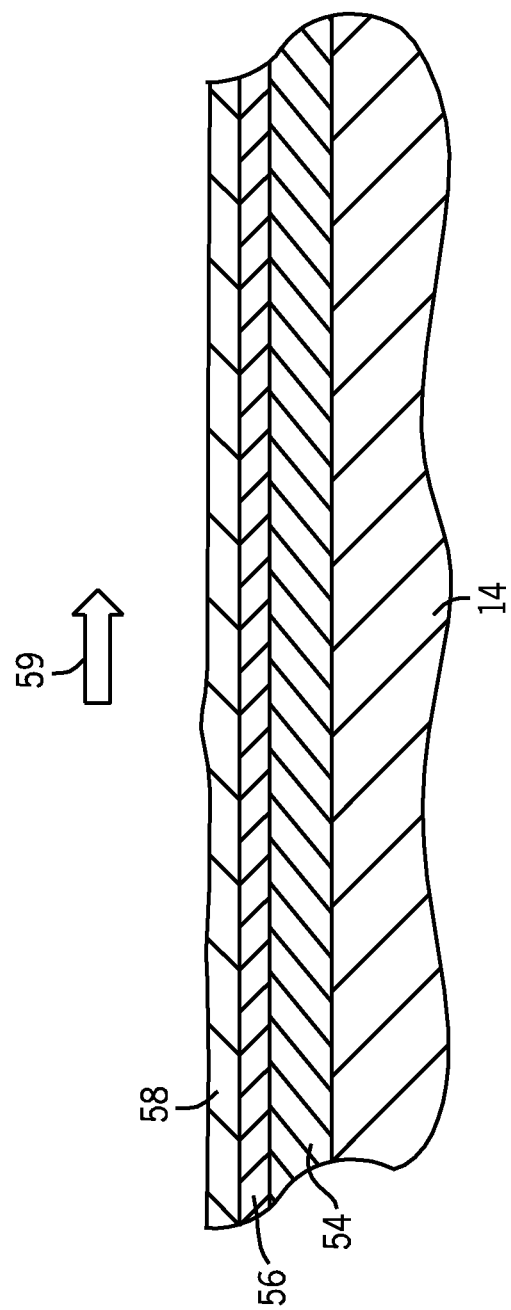
FIG. 4 is a sectional view of a portion of the catalytic reactor shown in FIG. 3 in accordance with certain embodiments.

FIG. 4 is a sectional view through a portion of the catalytic reactor 14 in accordance with certain embodiments. The reactor may generally include a catalytic coating 56 disposed on a substrate 54. As described above with respect to FIG. 3, the catalytic coating 56 may generally accelerate the combustion reaction. For example, for a hydrocarbon-based fuel, the catalytic coating 56 may accelerate the carbon monoxide and hydrocarbon reactions to lower the temperatures needed for the reaction, which, in turn, may result in lower emissions. As the fuel-air mixture 59 flows through the reactor 14, the fuel-air mixture 59 may pass over the catalytic coating 56 and combust to produce exhaust gases. The fuel-air mixture 59 may include various types of fuels, such as hydrocarbon fuels, non-hydrocarbon fuels (i.e. process gas, refinery gas, syngas, etc.) and mixtures thereof.

During certain periods of combustion, such as start-up after an installation, increased levels of particulates and/or contaminants may be transported to the catalytic reactor 14. These contaminants may attach or adhere to the surface of the catalyst 56 which may foul the catalytic reactor, thereby reducing the catalytic reactor efficiency. Accordingly, a sacrificial coating 58 may be disposed as a protective coating over the catalyst 56, thereby protecting the catalyst 56 during these periods of operation. For example, the sacrificial coating 58 may be disposed over the catalyst 56 during the initial start-up of the turbine engine, or after replacement of certain pieces of equipment, such as the air compressor or fuel supply system. In certain embodiments, the catalytic reactor 14 may be provided by the manufacturer with the sacrificial coating 58 in place so that it may be utilized upon start-up of the combustor. However, in other embodiments, the sacrificial coating 58 may be applied after the catalytic reactor 14 has been installed within a combustor, e.g., before start-up of the gas turbine engine 12, during an offline or non-operational state of the gas turbine engine 12 (e.g., while combustion is not occurring in the combustion section 20), or any combination thereof. Moreover, the sacrificial coating 58 may be applied in one or more coatings or layers over the catalytic coating 56, wherein each coating 58 may be the same or different from the other sacrificial coatings 58 (e.g., same or different sacrificial materials, same or different removal mechanisms, etc.). In certain embodiments, the one or more sacrificial coatings 58 may be applied with a brush, a sponge, a fabric applicator, a spray gun (e.g., pneumatic spray gun or electrostatic spray gun), a liquid bath (e.g., a dip coating), sheets that are mounted over the catalytic coating 56, or any combination thereof. Thus, the sacrificial coatings 58 may be applied as a liquid, a vapor, a solid, a slurry (e.g., solid dispersed in a liquid) such as a green slurry, a gel such as a sol-gel, a vapor, a spray carried in a gas (e.g., air, nitrogen, or other inert gas), or any other suitable form.

The sacrificial coating 58 may generally inhibit damage to the catalyst 56 by providing a protective layer over the catalyst 56. In certain embodiments, the sacrificial coating 58 may form a physical bond with the catalyst 56. The sacrificial coating 58 may include any suitable frangible (e.g., easily broken apart) coating that may be chemically removed, mechanically removed, or thermally removed while the reactor is installed within the combustor. For example, the coating may be chemically removed using a simple solvent, such as water, alcohol, ethanol, ethylene glycol, degreasers, detergents, or the like while remaining benign to combustion and turbine materials. The coating also may be mechanically removed by the application of mechanical forces, such as ultrasonic vibrations, pressure waves, and mechanical impact among others. For example, walnut shells may be directed through the catalytic reactor 14 to break apart the sacrificial coating 58. The fragmented pieces of the sacrificial coating 58 may then be flushed out of the reactor 14, for example, during a compressor wash cycle. By further example, the gas turbine engine 12 may include a control mode having instructions to induce combustion dynamics in the combustion section 20, thereby generating or increasing combustion dynamics (e.g., pressure waves and resulting vibration) to remove the sacrificial coating 58. The gas turbine engine 12 may further include a control mode having instructions to induce acoustic waves by controlling one or more acoustic speakers or detonation wave horns, or instructions to induce pressure waves by controlling one or more combustion-driven devices. Regardless of the removal method, the sacrificial coating 58 may be generally removable without damaging the underlying catalyst 56. Further, the sacrificial coating 58 may be removable without disassembly of the combustor components.

In certain embodiments, the sacrificial coating 58 may be disposed on other sections of the catalytic reactor 14 in addition to the catalyst 56. For example, the sacrificial coating 58 may be applied to parts of the liner 48, which may provide a thermal barrier during start-up or other operations. The sacrificial coating 58 may be removed from other sections of the reactor 14 during removal of the sacrificial coating 58 from the catalyst 56.

The sacrificial coating 58 (and each of the sacrificial coatings disclosed herein) may include any suitable type of coating, such as an inorganic oxide, a silicate, an inorganic halide, a metal nitrate, a metal chlorate, a metal acetate, a metal sulfate, a metal hydroxide, an organometallic compound, a mixed organic-inorganic oxide composition, a halogenated carbon compound, a combination thereof, or other frangible coating that is chemically, mechanically, and/or thermally removable. For example, an inorganic oxide coating may include combinations of calcium and oxygen, such as calcium oxide (CaO), which may be removed using a water based solvent, or nickel oxide (NiO), which may be removed using a hydroxide based solvent. In another example, an organic coating may be employed to form an oxygen barrier that may be removed during oxidation or thermally volatized. In certain embodiments, the sacrificial coating 58 may include bismuth subsalicylate, such as Pepto-Bismol® commercially available from Proctor and Gamble of Cincinnati, Ohio, or polytetrafluoroethylene (PTFE) such as Teflon® commercially available from DuPont of Wilmington, Del. In some embodiments, the sacrificial coating 58 may include milk of magnesia, magnesia hydroxide, or bismuth subsalicylate solutions. In certain embodiments, the sacrificial coating 58 may be comprised of relatively stable and environmentally friendly compounds to abate environmental concerns upon removal of the sacrificial coating 58. Furthermore, the sacrificial coatings 58 may be applied as a liquid, a vapor, a solid, a slurry (e.g., solid dispersed in a liquid) such as a green slurry, a gel such as a sol-gel, a vapor, a spray carried in a gas (e.g., air, nitrogen, or other inert gas), or any other suitable form. Accordingly, the sacrificial coatings 58 may be applied with a variety of applicators, such as a brush, a sponge, a fabric applicator, a spray gun (e.g., pneumatic spray gun or electrostatic spray gun), a liquid bath (e.g., a dip coating), or any combination thereof. The sacrificial coatings 58 also may be applied as sheets that are mounted over catalytic coating 56, e.g., with an adhesive, fasteners, or other mounting hardware. Table 1 below lists some, but not all, potentially suitable sacrificial materials, which may be used alone or together in various combinations, as one or more sacrificial coatings 58 (and each of the sacrificial coatings disclosed herein).

TABLE 1

Examples of suitable sacrificial coating materials

| Class | Material | Green Slurry | Sol-Gel Application | Single Layer Coating | Dual Layer Coating Base Layer | Dual Layer Coating HT Top | Water Soluble | Rapid Degradation @ T > Tcd + 100 F. |
|---|---|---|---|---|---|---|---|---|
| Oxides + Org | Al2O3 + Zr2O3 + NaPO4 + Sugar | Y | NA | Y | Y | Y | Y | N |
| Oxides + Org | high MW surfactant polymer + ceramic powder (CaO, SiC, etc.) | Y | NA | Y | Y | Y | Y | N |
| silicate | Si—C | Y | Y | Y | NA | Y | N | N |
| silicate | MoSi2 | Y | Y | Y | NA | Y | N | N |
| Silicate/Oxide | slip cast clay/porceline | Y | Y | Y | Y | Y | N | N |
| Oxide | mullite | Y | Y | Y | NA | Y | N | N |
| Oxide | barium titanate (BaTiO3) | Y | Y | Y | NA | Y | N | N |
| Oxide | SrTiO3. | Y | Y | Y | NA | Y | N | N |
| Oxide | Al2O3 | Y | Y | Y | NA | Y | N | N |
| Oxide | gel aluminide | Y | Y | Y | NA | Y | N | N |
| Oxide | TBC (yttria stabilized) | Y | Y | Y | NA | Y | N | N |
| Oxide | Zr2O3 | Y | Y | Y | NA | Y | N | N |
| Oxide | Fe2O3 | | Y | Y | NA | Y | N | N |
| Oxide | CaO | Y | Y | Y | NA | Y | N | N |
| Oxide | nickel oxide (NiO) | Y | Y | Y | Y | Y | N | N |
| Ionics | phosphate alumina | Y | Y | Y | Y | Y | Y | N |
| Ionics | (NH4)y Xz | | Y | Y | Y | NA | Y | Y |
| Ionics | Nay Xz | | Y | Y | Y | NA | Y | Y |
| Ionics | Ky Xz | | Y | Y | Y | NA | Y | Y |
| Ionics | Metal compound of NO3— | | Y | Y | Y | NA | Y | Y |
| Ionics | Metal compund of ClO3— | | Y | Y | Y | NA | Y | Y |
| Ionics | Metalcompund of CH3COO— | | Y | Y | Y | NA | Y | Y |
| Ionics | Metal compounds of SO4-2: FeSO4, MgSO4 | | Y | Y | Y | NA | Y | Y |
| Ionics | MgOH | Y | Y | Y | Y | Y | Y | N |
| X-taline Org | DLC | | | | Y | | N | Y |
| Metal Org | bismuth subsalicylate | | Y | Y | Y | N | Y | Y |
| Nitride/Oxide | hexagonal boron nitride (B2O3) | Y | Y | Y | Y | Y | Y | N |

In certain embodiments, the use of a magnesium, manganese, iron, nickel, or chromium based coating may provide additional catalytic properties to the sacrificial coating 58. The catalytic properties may allow the sacrificial coating 58 to accelerate the combustion reaction when the sacrificial coating is disposed on the catalyst 56. For example, the sacrificial coating 58 may be disposed on the catalyst 56 prior to or during initial start-up of the gas turbine engine 12 (FIG. 1). In certain embodiments, the sacrificial coating 58 may be applied to the catalyst 56 before assembly of the gas turbine engine 12, during an offline or non-operational state (e.g., while no combustion is occurring) of the gas turbine engine 12, during a servicing or maintenance operation on the gas turbine engine 12, or any combination thereof. As shown in FIG. 4, the sacrificial coating 58 may be disposed over the catalyst so that the combustion gases 52 are unable to contact the catalyst 56. However, the combustion gases 52 may contact the sacrificial coating 58 and the catalytic properties of the sacrificial coating 58 may function to accelerate the combustion reaction, thereby reducing emissions when the sacrificial coating 58 is disposed within the reactor 14. In other embodiments, the sacrificial coating 58 may be doped with a catalyst. For example, the sacrificial coating 58 may be doped with a platinum group metal, such as ruthenium, rhodium, palladium, osmium, iridium, and/or platinum in order to enhance the catalytic properties of the sacrificial coating 58. In other embodiments, other doping agents with catalytic properties, such as iron, cobalt, and/or nickel, may be employed with the sacrificial coating 58.

Figure 5:
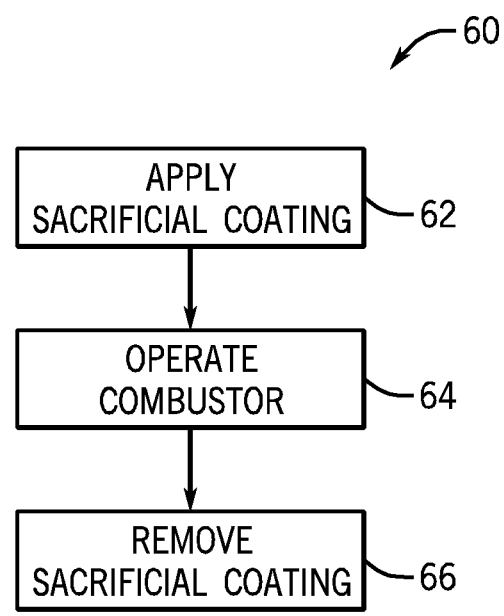
FIG. 5 is a flow chart depicting an exemplary method for employing a sacrificial coating in accordance with certain embodiments.

As noted above, the sacrificial coating 58 may be temporarily disposed over the catalyst to protect the catalyst during periods of operation when the catalyst may be prone to damage from contaminants and/or particulates, such as those typically deposited during commissioning. FIG. 5 depicts an exemplary method 60 for employing a sacrificial coating 58 in a catalytic reactor 14. The method may begin by applying (block 62) the sacrificial coating to the catalyst. In certain embodiments, the sacrificial coating 58 may be applied by the manufacturer during assembly of the catalytic reactor 14, during assembly of the combustion section 20, during assembly of the gas turbine engine 12, or any other assembly process prior to operation (or during an offline state) of the gas turbine engine 12. For example, the sacrificial coating 58 may be applied over the catalytic reactor 14 during original installation or as part of a retrofit to the combustor 30. However, the sacrificial coating 58 also may be applied to the catalytic reactor 14 after assembly and/or during operation of the gas turbine engine 12, e.g., through an access port in the combustion section 20, through an existing fluid system (e.g., fuel system, water or steam injection system, nitrogen injection system, etc.), or any other suitable technique. For example, during assembly, the sacrificial coating 58 may be sprayed onto the catalyst using a type of masking application, or the sacrificial coating 58 may be applied via spraying, brushing, dipping, painting, meniscus coating, and the like. In some embodiments, the sacrificial coating 58 may be applied in a green slurry form or a sol gel form, wherein a carrying medium is used to deliver the sacrificial coating, and the carrying medium dries out and may result in a crystalline form of the sacrificial coating. However, the sacrificial coating 58 may be applied as a liquid, vapor, gel, slurry, solid, or any combination thereof, using a variety of applicators, such as a brush, spray gun, or bath. During application, the sacrificial coating 58 may be disposed on the catalyst 56 as well as other areas of the combustor 30 (FIG. 3), such as the combustion liner 48 (FIG. 3). After application, a drying process or other post-application process may occur, and in certain embodiments, the gas turbine engine 12 may be engaged to provide heat to facilitate these post-application processes.

After application of the sacrificial coating 58, the method may continue by operating (block 64) the combustor 30 for a set period. The period length may be based on a variety of factors, such as manufacturer recommendations, the type of installation, manufacturing considerations, and the like. For example, during start-up of a gas turbine engine 12, the combustor 30 may be operated for approximately 10 to 250 hours, and all subranges therebetween. More specifically, the combustor 30 may be operated for approximately 50 to 150 hours. During this period, loose particulates and contaminates may flow through the gas turbine engine 12. In another example, the combustor 30 may be operated after replacement of a compressor 18 for approximately 200 hours.

After the period has passed, the sacrificial coating 58 may be removed by one or more removal techniques (e.g., water wash, thermal removal, chemical removal, pressure wave removal, etc.) as indicated by block 66. The removal process may take place while the catalytic reactor 14 and the combustor 30 are housed within the gas turbine engine 12. For example, if the sacrificial coating 58 is water soluble, the sacrificial coating 58 may be dissolved during testing of the compressor wash system using an engine water wash. In another example, a detergent or other simple solvent may be directed through the combustor 30 to remove the sacrificial coating 58. In certain embodiments, after use of a simple solvent other than water, a water wash may be performed to flush any remaining solvent from the combustor 30. In some embodiments, ablation, ultrasonic vibrations, or a gas pressure pulse (i.e., a shockwave, etc.) may be applied to the combustor 30 to break up the sacrificial coating 58. For example, the sacrificial coatings 58 may be removed with mechanical vibration and/or pressure waves, e.g., by applying acoustic waves from an acoustic horn or speaker or by applying pressure waves from a combustion-driven device. By further example, the sacrificial coatings 58 may be removed by inducing combustion dynamics in the combustor, thereby generating pressure waves and vibration to help break the sacrificial coatings 58 off of the catalytic reactor 14. The sacrificial coatings 58 also may be removed with heat, e.g., by gradually thermally degrading the sacrificial coating 58 until it is completely removed over a limited time period. After vibration, heat, mechanical, and/or other removal, a water wash may be applied to flush the fragments of the sacrificial coating 58 from the combustor 30 and the gas turbine engine 12.

Figure 6:
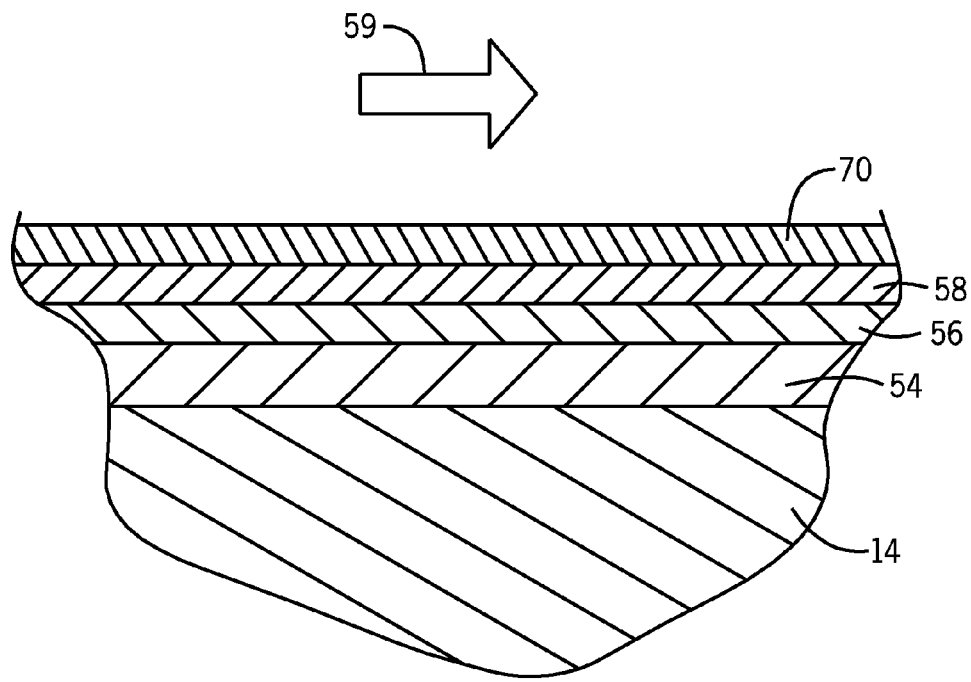
FIG. 6 is a sectional view of a portion of the catalytic reactor shown in FIG. 3, illustrating multiple sacrificial coatings in accordance with certain embodiments.

Oftentimes, it may be desirable for the sacrificial coating 58 to contain a multiplicity of advantageous properties, including water solubility, high-temperature endurance, catalytic activity, and other properties. To achieve this, it may be beneficial to apply multiple layers of sacrificial coatings as shown in FIG. 6. In this embodiment, two sacrificial coatings are shown disposed on the catalytic reactor 14, each comprising a different material. The first sacrificial coating 58 is in direct contact with the catalyst 56. A second sacrificial coating 70 is disposed on top of the first sacrificial coating 58. The second sacrificial coating 70 may come in contact with the fuel-air mixture 59. At least one of the sacrificial coatings 58 and 70 also may include at least some catalytic material. In certain embodiments, the first and second sacrificial coatings 58 and 70 may be removed with the same or different removal techniques, such as any one or more of the following: liquid wash (e.g., water or solvent wash), ablation, vibration, acoustic waves, pressure waves (e.g., speakers, horns, or combustion), combustion dynamics, or thermal removal.

In some embodiments, the first sacrificial coating 58 may include a water soluble material while the second sacrificial coating 70 may include a high-temperature resistant material or crust. For example, the second sacrificial coating 70 may be at least approximately 1.1 to 10, 1.2 to 5, or 1.3 to 3 times more temperature resistant as the first sacrificial coating 58.

By further example, the second sacrificial coating 70 may be at least 10 to 1000, 20 to 500, or 30 to 250 degrees Celsius more temperature resistant as the first sacrificial coating 58. The high-temperature resistant crust forming the second sacrificial coating 70 may protect the first sacrificial coating 58 in the event that the temperature of the environment, approximated by the TCD (temperature at compressor discharge), is approaching the first sacrificial coating's 58 temperature limit. For example, the first sacrificial coating 58 may be magnesium sulfate ($MgSO_4$), which is water soluble; the second sacrificial coating 70 may be magnesia (MgO), which is less water soluble than magnesium sulfate, yet more temperature resistant than magnesium sulfate. In certain embodiments, the second sacrificial coating 70 may be a thermally removable material, e.g., a material composition that thermally degrades over a certain time period in the presence of the start-up conditions in the gas turbine engine 12, e.g., 10 to 1000, 20 to 500, or 30 to 250 hours. After thermal degradation/removal of the second sacrificial coating 70, the first sacrificial coating 58 is still effective to protect the catalyst 56 of the catalytic reactor 14. Subsequently, the first sacrificial coating 58 may be removed with a water wash to expose the underlying catalyst 56. In other embodiments, the second sacrificial coating 70 may be removed by ablation, vibration, acoustic waves, pressure waves (e.g., speakers, horns, or combustion), or combustion dynamics. For example, the gas turbine engine 12 may be controlled to induce or increase combustion dynamics in the combustion section 20, thereby increasing pressure waves and vibration to cause removal of the second sacrificial coating 70 and/or the first sacrificial coating 58. Any residual sacrificial coating 58 may be removed with a water wash.

To achieve the layered configuration shown in FIG. 6, the first sacrificial coating 58 may be applied to the catalyst 56 via spraying, dipping, brushing, painting, other application processes, or a combination thereof. The thickness of the first sacrificial coating 58 may be within a range of approximately 0.001 mm to 10 mm thick, 0.01 mm to 1 mm thick, or 0.05 mm to 0.3 mm thick, depending on properties of the first sacrificial coating 58. A drying period or other intermittent process may occur prior to the application of the second sacrificial coating 70. Similarly, the second sacrificial coating 70 may be applied by spraying, dipping, brushing, painting, another application process, or a combination thereof. The thickness of the second sacrificial coating 70 may be within a range of approximately 0.001 mm to 10 mm thick, 0.01 mm to 1 mm thick, or 0.05 mm to 0.3 mm thick, depending on properties of the second sacrificial coating 70. In certain embodiments, the first and second sacrificial coatings 58 and 70 may have the same or different thicknesses, the same or different materials, and may be applied with the same or different techniques (e.g., spraying, dipping, brushing, or painting). A second post-application process may occur for the second sacrificial coating 70. After both sacrificial coatings 58 and 70 are complete, the catalytic reactor 14 may be mounted to the combustor 30. The combustor 30 may then be operated for a first period of time in which the sacrificial coatings 58 and 70 may protect the catalyst 56 from particulate by-products created during initial start-up of the turbine engine 12, or after replacement of certain pieces of equipment, such as the compressor 18 or fuel supply system.

In order to expose the catalyst 56 in FIG. 6, the second sacrificial coating 70 may be removed prior to the first sacrificial coating 58. For example, the second sacrificial coating 70 may be removed by thermal degradation, while the first sacrificial coating may be removed via water wash. In other embodiments, the second sacrificial coating 70 and the first sacrificial coating 58 may be removed simultaneously with one or more removal techniques. Simultaneous removal of the sacrificial coatings 58 and 70 may be achieved through an ablative process, a frangible process, another form mechanical removal, or a different method. For example, the sacrificial coatings 58 and 70 may be removed by simultaneously applying one, two, or more of a water wash, vibration, acoustic waves, pressure waves, ablation, heat, or any combination thereof. A water wash may occur to remove any remaining particles of the sacrificial coatings 58 and 70. For example, sacrificial coatings comprised of highly porous ceramics may be removed utilizing flash vaporization of water due to hot compressor discharge gas contacting the highly porous ceramic after a water wash occurs, or the water wash may simply dissolve and remove remnants of sacrificial coatings 58 and 70 left behind by a prior removal step. The removal process may be completed while the catalytic reactor 14 remains mounted to the combustor 30. The combustor 30 may then be operated for a second period of time in which the catalyst 56 is exposed to the fuel-air mixture 59. During the second period of time, the catalyst 56 may affect the combustion reaction dynamics in a way such as to reduce the amount of NOx emissions. In the embodiment described by FIG. 6, two sacrificial coatings 58 and 70 are applied; however, any number of sacrificial coatings may be applied.

Figure 7:
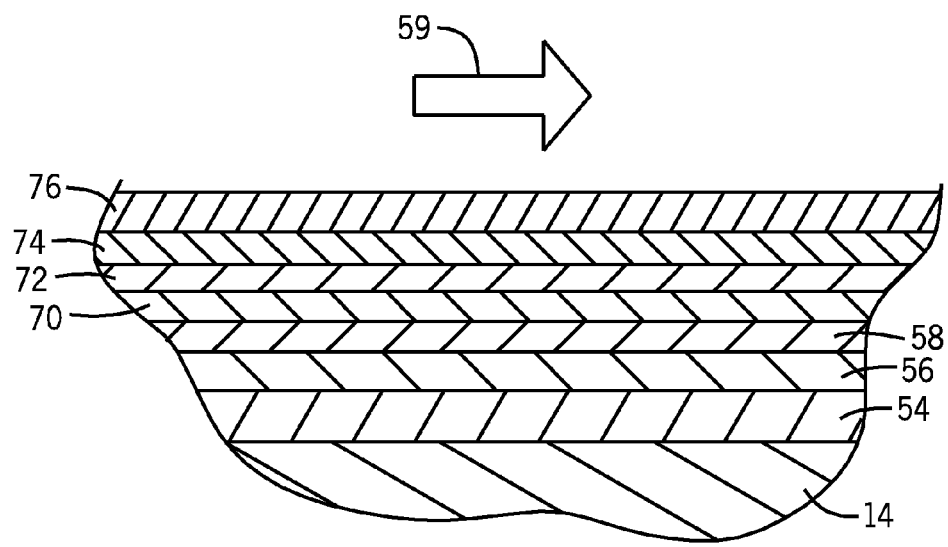
FIG. 7 is a sectional view of a portion of the catalytic reactor shown in FIG. 3, illustrating multiple sacrificial coatings in accordance with certain embodiments.

In a further embodiment depicted in FIG. 7, five sacrificial coatings are disposed over the catalyst 56. The first sacrificial coating 58 may be in direct contact with the catalyst 56. The second sacrificial coating 70 may be disposed on top of the first sacrificial coating 58. A third sacrificial coating 72 may be disposed on top of the second sacrificial coating 70. A fourth sacrificial coating 74 may be disposed on top of the third sacrificial coating 72. Further, a fifth sacrificial coating 76 may be disposed on top of the fourth sacrificial coating 74. The fifth sacrificial coating 76 may be in contact with the fuel-air mixture 59. The layering of the sacrificial coatings 58, 70, 72, 74, and 76 may provide multiple advantages within the catalytic reactor 14. For example, some sacrificial coatings 58, 70, 72, 74, and 76 may be highly water soluble, some may be high-temperature resistant, some may be catalytically active, some may be hygroscopic, and some may have other advantageous chemical properties. The multiple sacrificial coatings 58, 70, 72, 74, and 76 may also have multiple physical properties that are useful in a layered arrangement. For example, some sacrificial coatings 58, 70, 72, 74, and 76 may be clay-like and harden with heat provided by the gas turbine engine, some may be powdered, some may be crystalline, some may be foam-like and substantially porous, some may be gelatinous, and some may maintain other physical properties. In the embodiment depicted by FIG. 7, the first sacrificial layer 58 may be water soluble, such as magnesium sulfate ($MgSO_4$), nickel oxide (NiO), magnesium hydroxide ($MgOH_2$). The second sacrificial coating 70 may have high-temperature resistant properties such as magnesia (MgO), barium titanate ($BaTiO_3$), calcium oxide (CaO), or another temperature resistant material. The third sacrificial layer 72 may be catalytically active, such as manganese oxide (MnO), hematite (iron III oxide—$Fe_2O_3$), or another catalytically active material. The fourth sacrificial coating 74 may have a crystalline structure, and the fifth sacrificial coating 76 may be powdered.

In certain embodiments, each of the sacrificial coatings 58, 70, 72, 74, and 76 may be applied by the same or different application techniques, including but not limited to spraying (e.g., pneumatic spraying, liquid only spraying, electrostatic spraying, etc.), dipping in a bath (e.g., liquid bath, gel bath, slurry bath, etc.), plating (e.g., electroplating), painting (e.g., with a brush, sponge, or fabric applicator). Likewise, each of the sacrificial coatings 58, 70, 72, 74, and 76 may be applied in the same or different physical form, including but not limited to: liquid, solid (e.g., powder or clay), gel (e.g., sol-gel), slurry (e.g., solid particles dispersed in a liquid such as water, such as a green slurry), vapor, or any combination thereof. Furthermore, each of the sacrificial coatings 58, 70, 72, 74, and 76 may have the same or different characteristics, including but not limited to: thickness, temperature resistance, water solubility, chemical solubility, chemical resistance, material composition, hardness, wear resistance, catalytic effectiveness, or any combination thereof. For example, the material composition of each of the sacrificial coatings 58, 70, 72, 74, and 76 may include, but is not limited to, any one or more of the following: an inorganic oxide, a silicate, an inorganic halide, a metal nitrate, a metal chlorate, a metal acetate, a metal sulfate, a metal hydroxide, an organometallic compound, a mixed organic-inorganic oxide composition, a halogenated carbon compound, a combination thereof, or other frangible coating that is chemically, mechanically, and/or thermally removable. Furthermore, the material composition of each of the sacrificial coatings 58, 70, 72, 74, and 76 may include any one or more of the materials set forth in Table 1. Additionally, each of the sacrificial coatings 58, 70, 72, 74, and 76 may be removed with the same or different removal technique, including but not limited to: thermal removal (e.g., thermal degradation over a time period), water wash, chemical wash, ablation (e.g., walnuts or particulate), or any combination thereof. These removal techniques may be used alone or in any combination with one another to remove each coating 58, 70, 72, 74, and 76, either alone or in any group of coatings. In other words, the sacrificial coatings 58, 70, 72, 74, and 76 may be sequentially removed one after another using different removal techniques, or 2, 3, 4, or 5 sacrificial coatings may be simultaneously removed using one or more of these removal techniques. In various embodiments, any of the foregoing application techniques, physical forms, characteristics, and removal techniques may be used in various combinations for each of the sacrificial coatings 58, 70, 72, 74, and 76. Furthermore, one or more of the foregoing application techniques, physical forms, and characteristics may be used to provide a gradual change (e.g., a sequentially increasing, sequentially decreasing, or alternating pattern) in the aspects of the sacrificial coatings 58, 70, 72, 74, and 76 from one coating to another away from the catalyst 56. For example, the thickness, hardness, temperature resistance, wear resistance, catalytic properties, water or chemical solubility may gradually increase, decrease, or alternate from one sacrificial coating to another away from the catalyst 56.

The sacrificial coatings 58, 70, 72, 74, and 76 may be sequentially applied prior to assembly of the catalytic reactor 14 into the combustor 30 and/or prior to assembly of the combustor 30 into the gas turbine engine 12. In the embodiment of FIG. 7, the first sacrificial coating 58 may be applied to the catalyst 56 followed by the remaining coatings 70, 72, 74, and 76. The first sacrificial coating 58 may be applied via dipping, spraying, painting (e.g., with a brush, sponge, or fabric applicator), plating, or another method of application. The sacrificial coating 58 may be applied using a sol gel, a slurry (e.g., a green slurry), a liquid, or any other suitable form. There may be a post-application process (e.g., drying, heating, evaporating, curing, or the like), and then second sacrificial coating 70 may be applied via dipping, spraying, painting, plating, or another method of application. After a post-application process (e.g., drying, heating, evaporating, curing, or the like) for the second sacrificial coating 70, the third sacrificial coating 72 may be applied over the second sacrificial coating 70. The third sacrificial coating 72 may be applied using any of a variety of application methods as discussed above, followed by a post-application process (e.g., drying, heating, evaporating, curing, or the like). For example, there may be an evaporative process, a heating process, or another process performed following the application of the third sacrificial coating 72. The fourth sacrificial coating 74 may be applied after the completion of the third sacrificial coating 72. In a particular embodiment, the fourth sacrificial coating 74 may be applied using a form of thermal spraying. A post-application process (e.g., drying, heating, evaporating, curing, or the like) may occur, and then the fifth sacrificial coating 76 may be applied. Again, a post-application process (e.g., drying, heating, evaporating, curing, or the like) may occur to complete the fifth sacrificial coating 76. All five sacrificial coatings 58, 70, 72, 74, and 76 may be subjected to a final post-application treatment. Other processes or treatments also may be performed to prepare the sacrificial coatings 58, 70, 72, 74, and 76, after which the catalytic reactor 14 containing the catalyst 56 and the five sacrificial coatings 58, 70, 72, 74, and 76 may be mounted to the combustor 30. The combustor 30 may then be operated during a start-up or preliminary stage in the gas turbine engine 12 for a first time period. During the first time period, the sacrificial coatings 58, 70, 72, 74, and 76 may protect the catalyst 56 from particulates, occludents, or other contaminants. The first time period may be in a range of 10 to 500 hours, 50 to 300 hours, or 100 to 200 hours, depending on the system requirements. The embodiment of FIG. 7 depicts the use of five sacrificial coatings 58, 70, 72, 74, and 76; however, more or fewer sacrificial coatings may be applied.

After the first time period, in order to expose the catalyst 56 shown in FIG. 7, the five sacrificial coatings 58, 70, 72, 74, and 76 may be removed using at least one or more of the foregoing removal techniques. Each coating may be removed individually, or multiple coatings may be removed by a single process. The removal processes may occur before or after a system water wash. Removal processes may include mechanical, chemical, and/or thermal forms of removal that will not damage the catalyst 56 beneath the sacrificial coatings 58, 70, 72, 74, and 76. All removal processes may occur while the catalytic reactor 14 is disposed within the combustor 30. After removal of the majority or all of the sacrificial coatings 58, 70, 72, 74, and 76, a second period of combustion may occur wherein the catalyst 56 may be exposed to the fuel-air mixture 59. The presence of the catalyst 56 may reduce NOx emissions from the combustion reaction.

Figure 8:
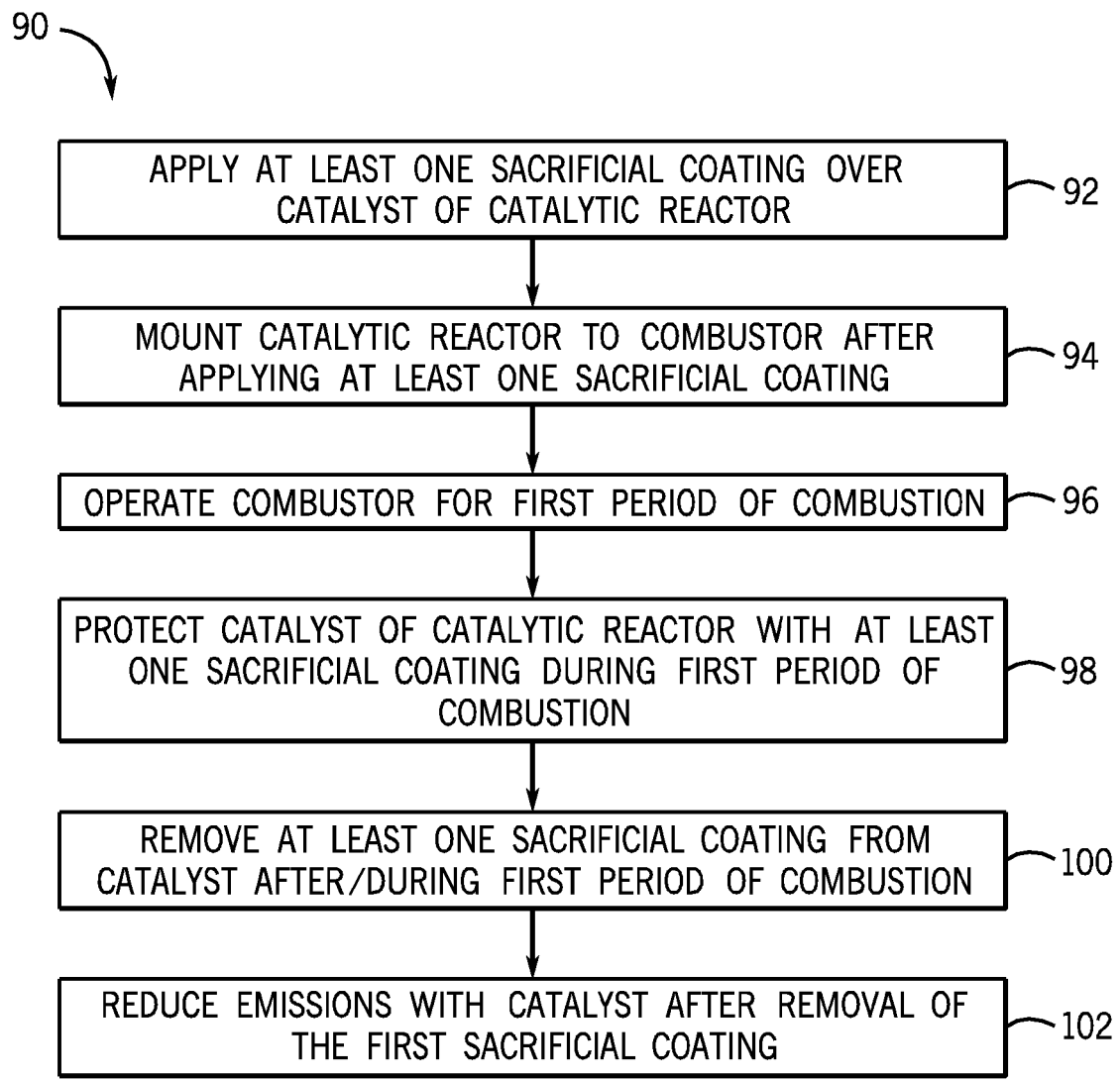
FIG. 8 is a flow chart depicting an exemplary method for employing multiple sacrificial coatings in accordance with certain embodiments.

FIG. 8 contains a method 90 for employing one or more sacrificial coatings on the catalyst 56 within the catalytic reactor 14. The method 90 for employing multiple sacrificial coatings depicted in FIG. 8 is merely one possible embodiment and may actually include additional or fewer steps than shown. The method 90 begins by applying at least one sacrificial coating over the catalyst 56 of the catalytic reactor 14 (block 92). As described in previous embodiments, one, two, three, four, five, or more sacrificial coatings (e.g., 1 to 100 sacrificial coatings) may be disposed over the catalyst 56. The method of application for each sacrificial coating may be different or the same. Methods of application include spraying, painting, dipping, plating, and other methods. Each sacrificial coating may be applied as a sol gel, a green slurry, or any liquid, vapor, solid, or slurry form. The sacrificial coatings may be applied individually or simultaneously, and each application may be followed by a drying, evaporative, curing, heating, or other post-application process.

After application of the sacrificial coatings is complete, the catalytic reactor 14 may be mounted into the combustor 30

(block 94). The combustor 30 may be operated for a first period of combustion (block 96) in a gas turbine engine 12. The first period of combustion may be during initial start-up of the gas turbine engine 12, e.g., a first start-up after manufacturing, servicing, or other repair, wherein the gas turbine engine 12 (or at least one or more of its components) has not yet been subject to normal operation of the engine 12. For example, the initial start-up may follow installation, replacement, or repair of the combustor 30 (or one of its components such as the liner, fuel nozzles, etc.), the compressor 18 (or one of its components such as compressor blades), the fuel supply system, or any other equipment. During these times, particulates, occludents, and other contaminants, which may be particularly damaging to the catalyst 56, may be exposed to the catalytic reactor 14. The sacrificial coatings (e.g., 58, 70, 72, 74, and/or 76) may protect the catalyst 56 of the catalytic reactor 14 during the first period of combustion (block 98) within the gas turbine engine 12. Following the first period of combustion, at least one sacrificial coating may be removed from the catalyst (block 100). Removal may include one or more of: ablation, thermal degradation, applying vibrations or pressure waves, a water wash, a chemical wash, or combination thereof, while the catalytic reactor 14 may remain mounted in the engine 12. Multiple sacrificial coatings may be removed simultaneously or each sacrificial coating may be removed independently in a sequence. After the majority of each of the sacrificial coatings is removed, the catalyst 56 may be exposed to the combustion reaction. The emissions of the combustion reaction may be reduced by the catalyst 56 after removal of the sacrificial coatings (block 102). The catalyst 56 affects the combustion reaction dynamics and may reduce the amount of NOx emissions generated by the reaction. Application and removal processes are described in more detail in further embodiments.

Figure 9:
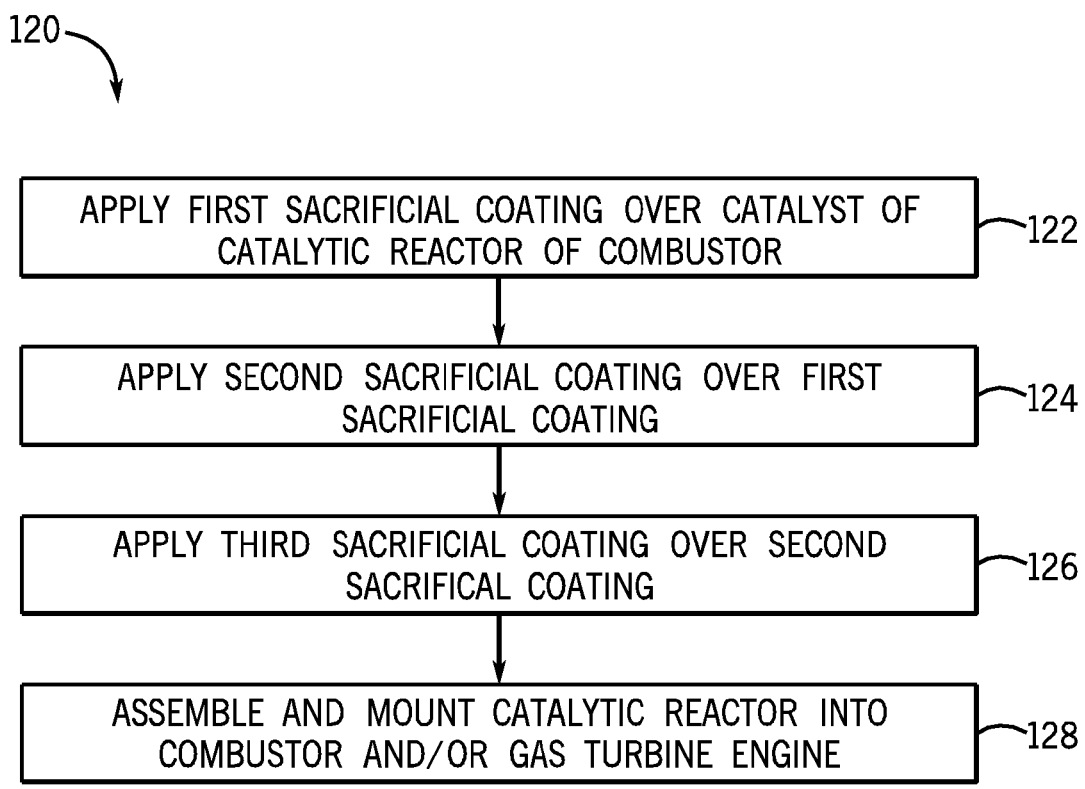
FIG. 9 is a flow chart depicting an exemplary method for applying multiple sacrificial coatings in accordance with certain embodiments.

FIG. 9 displays a flow chart depicting an exemplary method 120 for applying multiple sacrificial coatings on the catalyst 56 of a catalytic reactor 14. Method 120 may begin with the application of a first sacrificial coating 58 over the catalyst 56 of the catalytic reactor 14 of the combustor 30 (block 122). In one embodiment, the first sacrificial coating 58 may be a water soluble base layer, for example, nickel oxide (NiO) or boron trioxide ($B_2O_3$). The first sacrificial coating 58 may be applied using spraying, painting, dipping, plating, or another application method, or any combination thereof. After application of the first sacrificial coating 58, a post-application process may occur, such as, drying, curing, heating, evaporation, or another post-application process.

The second sacrificial coating 70 may be applied over the first sacrificial coating 58 (block 124). In an embodiment, the second sacrificial coating 70 may be a high-temperature resistant material, for example, molybdenum disilicide ($MoSi_2$) or dizirconium trioxide ($Zr_2O_3$). The second sacrificial coating 70 may provide extra protection to the catalyst 56. The second sacrificial coating 70 may be applied using any suitable method and may be applied independently from the first sacrificial coating 58 or simultaneously with the first sacrificial coating 58. A post-application process (e.g., drying, curing, heating, or evaporation) may be associated with the second sacrificial coating 70.

A third sacrificial coating 72 may be applied over the second sacrificial coating 70 (block 126). In an embodiment, the third sacrificial coating 72 may be catalytically active, for example, manganese oxide (MnO) or hematite (iron III oxide—$Fe_2O_3$). The use of a catalytically active third sacrificial coating 72 may allow the combustion reaction to take place in a catalytic environment, despite the catalyst 56 being covered. In this manner, the emissions from the combustion reaction may still be reduced while the catalyst 56 is protected from possible impurities. The third sacrificial coating 72 may be applied independently of, or simultaneously with, the first sacrificial coating 58 and the second sacrificial coating 70. Any suitable method of application may be used as discussed in detail above. After a possible post-application process (e.g., drying, curing, heating, or evaporation), the catalytic reactor 14 may be assembled and mounted into the combustor 30 of the gas turbine engine 12 (block 128). In the embodiment described by method 120, three sacrificial coatings 58, 70, and 72 are disposed over the catalyst 56. However, the method 120 may be employed to apply any number of sacrificial coatings (e.g., 1, 2, 3, 4, 5, 6, 7, 8, 9, 10, or more) to the catalyst 56 prior to assembly of the catalytic reactor 14 into the combustor 30.

Figure 10:
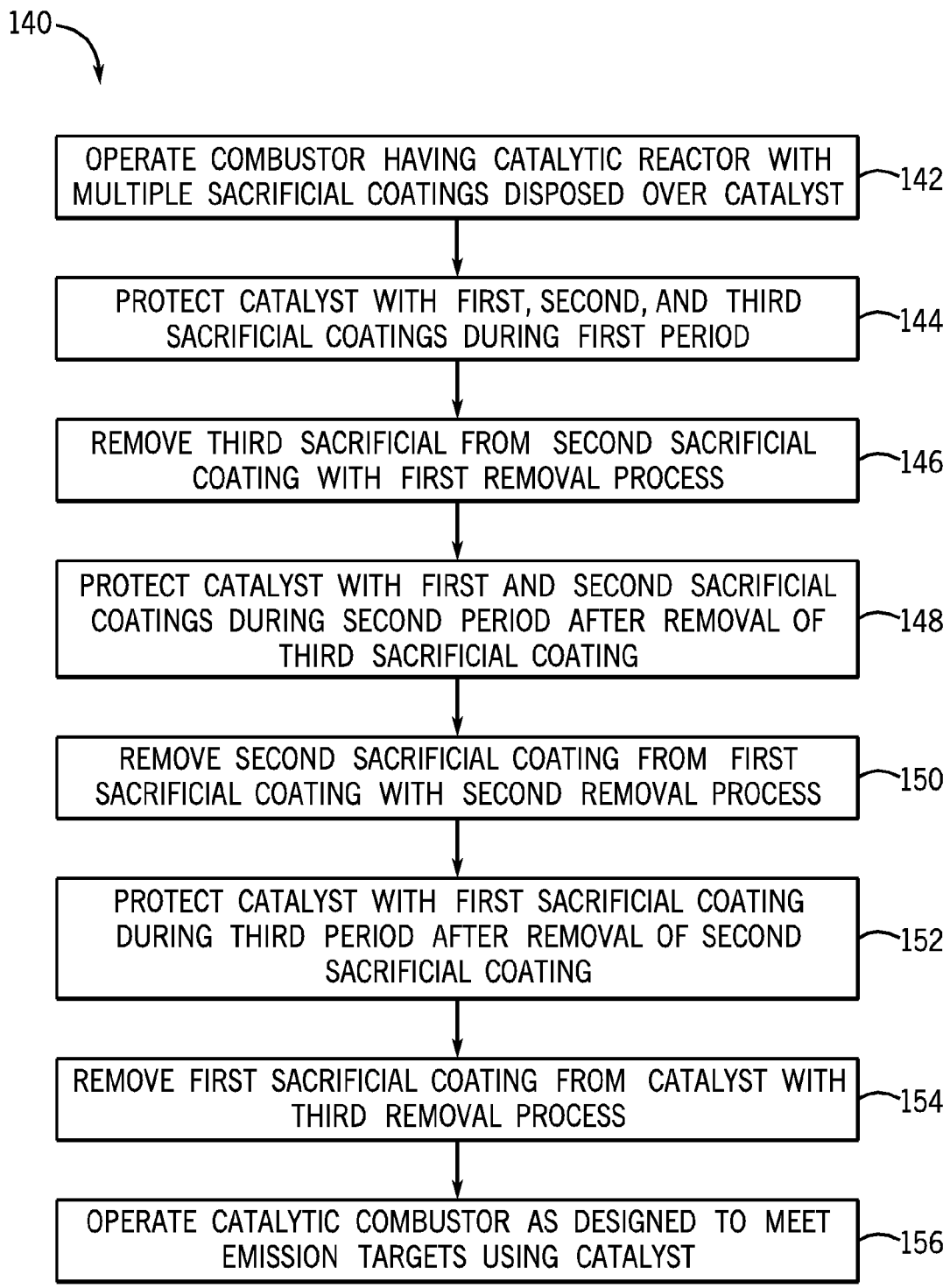
FIG. 10 is a flow chart depicting an exemplary method for operating a combustion system with a catalytic reactor and multiple sacrificial coatings in accordance with certain embodiments.

FIG. 10 is a flow chart depicting an exemplary method 140 for operating a combustion system with a catalytic reactor 14 and multiple sacrificial coatings in accordance with certain embodiments. In the embodiment described by method 140, three sacrificial coatings are disposed on the catalyst 56. As described by method 120 of FIG. 9, multiple sacrificial coatings may be applied to the catalyst 56 of the catalytic reactor 14 prior to assembly of the catalytic reactor 14 into the combustor 30 and/or prior to assembly of the combustor 30 into the gas turbine engine 12. After installation or assembly, the combustor 30 may be operated with multiple sacrificial coatings (e.g., 2, 3, 4, 5, or more) disposed over the catalyst 56 (block 142). The catalyst 56 is protected by the first, second, and third sacrificial coatings 58, 70, and 72 during a first period of combustion (block 144). The first period of combustion may occur during start-up of the gas turbine engine 12 or when components of the system 10 have been replaced, causing particulates to travel through the catalytic reactor 14. For example, this start-up period may occur as a first start-up after manufacturing, servicing, maintenance, or replacement of parts within the gas turbine engine 12, e.g., the combustor 30 or its components. The particulates may otherwise degrade the catalyst 56 without any sacrificial coatings present. Therefore, the sacrificial coatings 58, 70, and 72 (or any number of sacrificial coatings) are disposed over the catalyst 56 to provide protection during the initial start-up period, during which time contaminants may otherwise damage or prematurely degrade the catalyst 56. The first period of combustion may range approximately from 10 to 500 hours, 50 to 300 hours, or 100 to 200 hours, depending on the system requirements. After the amount of particulates being released into the catalytic reactor 14 has sufficiently decreased, the third sacrificial coating 72 may be removed from the second sacrificial coating 70 with a first removal process (block 146).

The first removal process (block 146), to remove a majority of the third sacrificial coating 72, may be such that the catalyst 56, the first sacrificial coating 58, and the second sacrificial coating 70 generally remain intact on the catalytic reactor 14. A multitude of methods for removal are possible. For example, the first removal process (block 146) may include applying heat (e.g., thermal degradation), a chemical wash, vibrations, or pressurized waves to remove the third sacrificial coating 72. After removal of the third sacrificial coating 72, the first and second sacrificial coatings 58 and 70 may protect the catalyst 56 during a second period of combustion (block 148). The second sacrificial coating 70 may be removed from the first sacrificial coating 58 with a second removal process (block 150). The second sacrificial coating 70 may be removed simultaneously with the third sacrificial coating 72, immediately following the removal of the third sacrificial coating 72, or any length of time following the removal of the third sacrificial coating 72. The second removal process (block 150) may include thermal or time based degradation, a chemical wash (e.g., the same or different from any wash used for the third sacrificial coating 72), or another method of removal which may result in the preservation of the first sacrificial coating 58 and the catalyst 56. After the removal of the second sacrificial coating 70, the catalyst 56 may be protected with the first sacrificial coating 58 during a third period of combustion (block 152). The third period of combustion may be any suitable length of time. At the end of the third period of combustion, the first sacrificial coating 58 may be removed from the catalyst 56 with a third removal process (block 154). The third removal process (block 154) may be, for example, a system water wash or chemical wash that dissolves the first sacrificial coating 58 while leaving the catalyst 56 intact. The third removal process (block 154) may also remove remnants of the second and third sacrificial coatings 70 and 72. After removal of the first sacrificial coating 58, the combustor 30 may be operated with the catalyst 56 exposed to meet emissions goals (block 156). For example, the gas turbine engine 12 may operate under normal operating conditions, while the catalyst 56 reduces emissions, e.g., NOx emissions.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a catalytic reactor configured to mount to a combustor, wherein the catalytic reactor comprises:
      a catalyst configured to reduce emissions associated with combustion in the combustor; and
      a first sacrificial coating disposed over the catalyst prior to mounting of the catalytic reactor into the combustor;
      a second sacrificial coating disposed over the first sacrificial coating prior to mounting of the catalytic reactor to the combustor, wherein the second sacrificial coating has a greater temperature resistance than the first sacrificial coating;
   wherein the first and second sacrificial coatings are removable while the catalytic reactor is mounted to the combustor without damaging the catalyst.

2. The system of claim 1, comprising a third sacrificial coating disposed over the second sacrificial coating prior to mounting of the catalytic reactor to the combustor, wherein the second and third sacrificial coatings are different from one another, and the third sacrificial coating is configured to allow combustion to take place in a catalytic environment when the first sacrificial coating, the second sacrificial coating, and the third sacrificial coating are disposed over the catalyst, wherein the first, second, and third sacrificial coatings are removable while the catalytic reactor is mounted to the combustor without damaging the catalyst.

3. The system of claim 1, comprising a third sacrificial coating disposed over the second sacrificial coating, wherein at least one of the first, second, and third sacrificial coating is water soluble, wherein at least one of the first, second, and third sacrificial coatings comprises a catalytic material.

4. The system of claim 1, wherein the first sacrificial coating comprises at least one of a silicate, an inorganic halide, a metal nitrate, a metal chlorate, a metal acetate, a metal sulfate, an organometallic compound, a mixed organic-inorganic oxide composition, a halogenated carbon compound, or a combination thereof.

5. The system of claim 1, wherein the first sacrificial coating comprises a ceramic.

6. The system of claim 1, wherein the second sacrificial coating degrades with temperature over time, and the first sacrificial coating is water soluble.

7. The system of claim 6, comprising a third sacrificial coating disposed over the second sacrificial coating prior to mounting of the catalytic reactor to the combustor, wherein the first, second, and third sacrificial coatings are removable while the catalytic reactor is mounted to the combustor without damaging the catalyst, wherein the third sacrificial coating comprises a catalytic material.

8. The system of claim 1, comprising the combustor having the catalytic reactor.

9. The system of claim 8, comprising a gas turbine engine having the combustor with the catalytic reactor.

10. The system of claim 1, wherein the first sacrificial coating comprises at least one of a silicate, an inorganic halide, a metal nitrate, a metal chlorate, a metal sulfate, or a combination thereof.

11. A method, comprising:
    applying a first sacrificial coating over a catalyst of a catalytic reactor;
    applying a second sacrificial coating over the first sacrificial coating, wherein the second sacrificial coating has a greater temperature resistance than the first sacrificial coating; and
    mounting the catalytic reactor to a combustor after applying the first sacrificial coating over the catalyst, wherein the sacrificial coating is removable while the catalytic reactor is mounted to the combustor without damaging the catalyst.

12. The method of claim 11, wherein applying the first sacrificial coating comprises applying a green slurry or a sol gel to form the first sacrificial coating over the catalyst.

13. The method of claim 11, wherein the first sacrificial coating comprises at least one of a silicate, an inorganic halide, a metal nitrate, a metal chlorate, a metal acetate, a metal sulfate, an organometallic compound, a mixed organic-inorganic oxide composition, or a combination thereof.

14. The method of claim 11, comprising operating a gas turbine engine having the combustor with the catalytic reactor, wherein the first sacrificial coating protects the catalyst during a first period of combustion in the combustor to inhibit fouling of the catalyst.

15. The method of claim 11, wherein the first sacrificial coating comprises at least one of a silicate, an inorganic halide, a metal nitrate, a metal chlorate, a metal sulfate, or a combination thereof.

16. The method of claim 11, comprising removing the second sacrificial coating by a first removal process, and subsequently removing the first sacrificial coating by a second removal process.

17. The method of claim 16, wherein the first removal process comprises thermally degrading the second sacrificial coating with temperature over time to remove the second sacrificial coating, and the second removal process comprises water washing the first sacrificial coating to remove the first sacrificial coating after removal of the second sacrificial coating.

18. The method of claim 11, comprising removing the first sacrificial coating and the second sacrificial coating to reveal the catalyst after mounting the catalytic reactor to the combustor.

19. The method of claim 18, wherein removing the first sacrificial coating comprises applying a water wash, applying vibration, applying pressure waves, thermally degrading, ablating, or using a frangible process, or a combination thereof, to remove the first sacrificial coating.

20. A method, comprising:
   protecting a catalyst of a catalytic reactor mounted to a combustor with at least a first and a second sacrificial coating during a first period of combustion in the combustor, wherein the second sacrificial coating has a greater temperature resistance than the first sacrificial coating; and
   reducing emissions with the catalyst during a second period of combustion after the first period of combustion in the combustor, wherein the at least one sacrificial coating is removed from the catalyst after the first period and before the second period while the catalytic reactor remains mounted to the combustor.

* * * * *